April 6, 1965     T. SCRAMLIN     3,176,706
PORTABLE TIRE PRESSURE GAUGE
Filed July 2, 1962
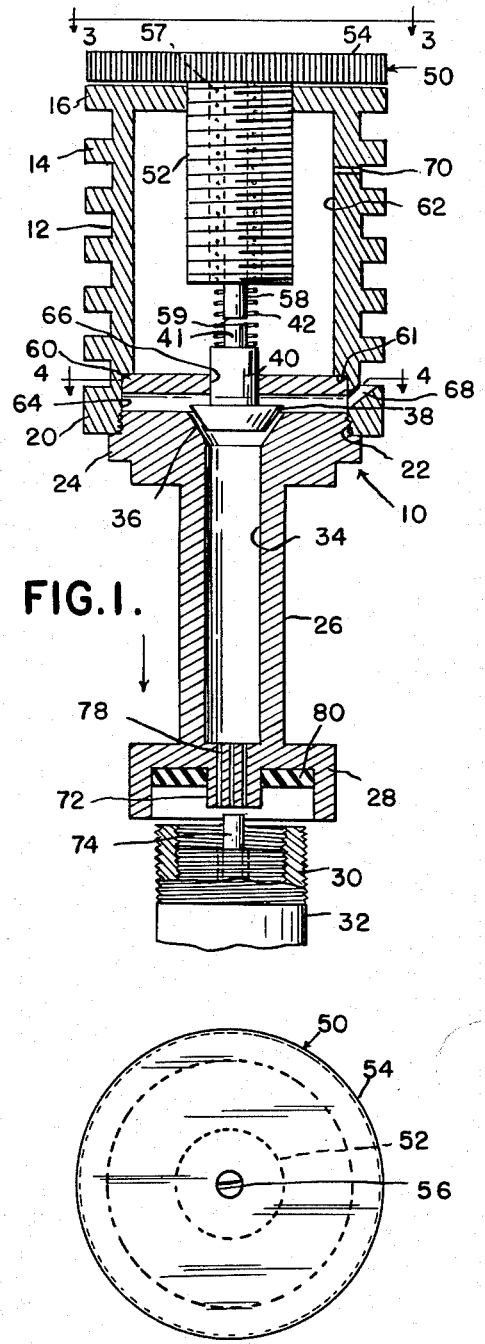
FIG.1.
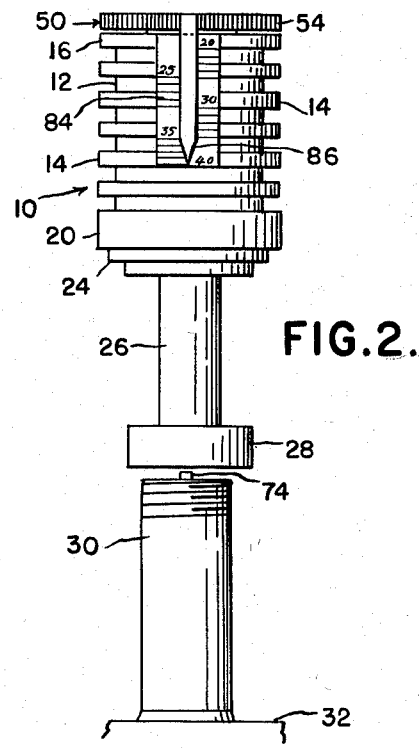
FIG.2.
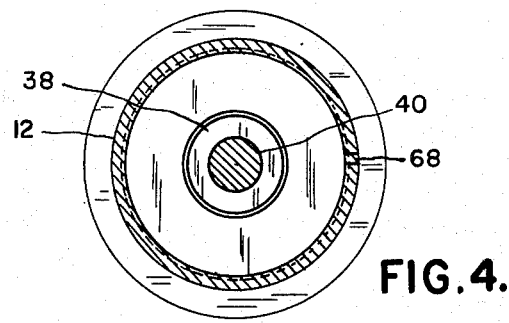
FIG.4.
FIG.3.
INVENTOR.
THURSTON SCRAMLIN
BY
*Whittemore, Hulbert*
*& Belknap*
ATTORNEYS 3,176,706
PORTABLE TIRE PRESSURE GAUGE
Thurston Scramlin, 4451 William Court,
Port Huron, Mich.
Filed July 2, 1962, Ser. No. 206,957
5 Claims. (Cl. 137—228)

This invention relates to a portable pressure gauge for an inflatable article such as a pneumatic tire or the like and relates more particularly to a pressure gauge which includes means for opening the interior of the article to the atmosphere when the pressure in the article exceeds the pressure setting on the gauge.

In inflating a pneumatic tire for the requisite air pressure, a trial and error method is utilized. It is the common practice to first place or press a gauge onto the valve stem of the tire to obtain a pressure reading. If the gauge indicates there is not enough air pressure within the tire, the operator adds air to the tire. If the pressure of the air in the tire is above the required limit, the operator lets air out of the tire. The operator then presses the gauge on the valve stem once again and takes a new pressure reading. If the requisite pressure is within the tire, nothing need further be done. However, this is generally not the case. Usually the operator has not placed enough air in the tire or has added too much to the tire and therefore the trial and error procedure recited previously has to be followed until exact pressure is obtained.

It is obvious that such a procedure is both time consuming and laborious. In addition, the gauges employed at different gas stations are not always accurate and therefore different readings can be obtained at different gas stations depending on the gauges utilized.

The present invention has overcome the disadvantages mentioned previously by providing a portable pressure gauge which is adapted to fit on the valve stem of a tire and open only upon over-inflation of the tire to permit air in the tire to escape until the requisite air pressure is obtained. If the tire is under-inflated, the gauge does not open and the operator has to add air to the tire in an amount sufficient to slightly over-inflate the tire, after which time the pressure gauge is once again placed on the valve stem such that air in the tire is vented to atmosphere until the requisite tire pressure is obtained as determined by the setting of the gauge.

It is an object of the present invention to provide a portable pressure gauge which is suitable for over-inflated articles such as pneumatic tires to vent the excess pressure, such as air, to atmosphere.

It is another object of the present invention to provide a portable pressure gauge comprising a body which is provided with an elongated stem at one end thereof, said stem including an axially extending passage which is in communication with the interior of the body, a valve seat in the passage adjacent the interior of the body, an escape port in a wall of the body, a valve element in the body, resilient means in the body for biasing the valve element toward the valve seat, an actuating element on the outer end of the elongated stem which is adapted to bear against the stem of an over-inflated article to open the article and thereby direct the gaseous medium in the article through the elongated stem against the upstream side of the valve element, said valve element being moved away from the valve seat when the pressure at the upstream side of the valve element exceeds the pressure on the valve element which is determined by the resilient means to permit the gaseous medium to flow across the valve seat, through the body and escape port until the pressure of the gaseous medium in the articles is reduced to a point where the valve element is urged against the valve seat by the resilient means.

Another object of the present invention is to provide a portable pressure gauge of the aforementioned type wherein the resilient means is in the form of a spring.

Still another object of the present invention is to provide a portable pressure gauge of the aforementioned type wherein means are provided for limiting the movement of the valve element away from the valve seat.

A further object of the present invention ils to provide a portable pressure gauge of the aforementioned type wherein means are provided for varying the effectiveness of the resilient means.

A still further object of the present invention is to provide a portable pressure gauge of the aforementioned type wherein an adjustable indicator is rotatably carried by the body and co-operates with suitable indicia provided on the outer surface of the valve body so as to indicate the setting of said resilient means, the rotational movement of the indicator varying the effectiveness or setting of the resilient means.

Another object of the present invention is to provide a device for indicating over-inflation of an inflatable article and for correcting the condition.

It is an object of the present invention to provide a simplified, low-cost structure of the aforementioned type having certain advantages contributing to efficiency, reliability, and long life, as well as ease of maintenance.

Further objects and advantages of the present invention will be apparent from the following description, reference being had to the accompanying drawing wherein a preferred form of the present invention is clearly shown.

FIGURE 1 is a vertical sectional view through the portable pressure gauge.

FIGURE 2 is an elevational view of the portable gauge in a position to be moved onto the valve stem of an inflatable article.

FIGURE 3 is a plan view looking in the direction of arrows 3—3 of FIGURE 1.

FIGURE 4 is a sectional view taken substantially on line 4—4 of FIGURE 1.

Referring now to the drawing, the portable pressure gauge is designated by the numeral 10. The gauge 10 includes a hollow elongated body or casing 12 of substantially circular cross-section having on the outer surface thereof a plurality of longitudinally spaced circumferentially extending annular ribs 14. The upper end wall 16 of the body 12 is integrally formed with the main portion of the body 12 as best illustrated in FIGURE 1. The lower end 20 of the body 12 is internally threaded as indicated by the numeral 22 and is adapted to receive the threaded head 24 provided on the tubular stem or element 26. The element 26, which is of circular cross-section, has at the outer end thereof a cup-shaped socket 28 which is adapted to fit freely over an end of a valve tube 30 of an inflatable article 32, such as a pneumatic tire, as will be subsequently described.

The tubular stem 26 has a longitudinally extending passage 34 which is in communication with the interior of the body 12. The upper end of the passage 34 is provided with a tapered valve seat 36. A tapered valve element 38 provided with a cylindrically shaped stem 40 is located in the body 12 and urged against the valve seat 36 by the resilient means 42 which in the present embodiment is in the form of a coil spring.

An indicator 50 is threadedly carried by the end wall 16 of the body 12 and is rotatable about an axis which is coincidental with the longitudinal axis of the body 12 and stem 26. The indicator 50 includes an inwardly extending exteriorly threaded tubular stem 52 threadedly engaging the end wall 16 of the body 12, and a knurled disc 54 upon the outer side of said end wall 16 and rigidly connected to the upper end of said tubular stem 52. An elongated solid spring guide 58 of circular cross-section is received within and concentric with the stem 52. The upper end of the spring guide 58 is connected to the disc 54 by means of a threaded fastener 56 which is illustrated in FIGURE 3. The coil spring 42 is located within the tubular stem 52 around the guide 58. The upper end 57 of the spring 42 bears against the lower surface of the disc 54 while the lower end thereof rests against an abutment provided on the stem 40 of the valve element 38. With such an arrangement the resilient means 42 biases the valve element 38 toward the seat 36.

The lower end of the spring guide 58 is spaced from and in alignment with a reduced part 41 of the valve stem 40 and provides an abutment surface 59 for limiting the upward movement of the valve element 38 at certain settings of the indicator 50.

A partition 60 is provided in and fixedly secured to the body 12 near the lower end 20 thereof so as to divide the body 12 into a spring chamber 62 and a valve chamber 64. The partition 60 is held against an internal shoulder 61 in the body 12 by means not shown. The partition 60 has a centrally located opening 66 for the valve stem 40. An escape port 68 is provided in the side wall of the body 12 to connect the valve chamber 64 to the atmosphere. The partition 60 provides a barrier for preventing dirt and other particles from entering the spring chamber 62 and changing the effectiveness of the resilient means 42. The spring chamber 62 is vented to atmosphere through port 70.

The socket 28 provided on the steam 26 includes an actuating element 72 of circular cross-section. The element 72 is integrally formed with the socket 28 as best illustrated in FIGURE 1 and is adapted to be urged against the depressible valve stem 74 of the inflatable article 32 to open the interior thereof. The actuating element 72 is located at the lower end of the passage 34. A plurality of elongated passages or ports 78 are provided in the actuating element 72 to permit air from the inflatable article 32 to enter the passage 34 in the stem 26. As an example, five such passages may be utilized with one in the center and four around the periphery thereof.

A resilient annular seal or washer 80 made from rubber or equivalent material is carried by the socket 28 and surrounds the cylindrical element 72.

The outer periphery of the body 12 is provided with suitable indicia or graduations 84 as indicated in FIGURE 2. The graduations are arranged to indicate the compression or setting of the spring 42, as an example, between 20 pounds and 40 pounds. The number of graduations would depend of course on the particular application for which the gauge 10 is primarily designed and the strength of the spring or resilient means utilized therein.

An elongated marker or pointer 86 is carried by the disc 54 as best indicated in FIGURE 2. The setting or effectiveness of the spring 42 is initially adjusted or calibrated in the factory such that the pointer 86 is opposite a graduation 84 on the body 12 to indicate the exact setting of the spring 42. The resilient means or spring 42 may be selected such that one revolution of the disc 54 corresponds to a one-pound change in the setting of the spring. One revolution of the disc 54 moves the pointer one graduation so as to vary the effectiveness of the spring 42 one pound. With such a construction the exact setting of the spring or resilient means 42 is always known.

It should be understood that other types of scales may be utilized and that the pressure range may be changed to suit different applications. In addition, any number of turns of the disc 54 or any fraction thereof may be utilized to indicate a change of one pound in the setting of the spring.

In operation, assume that it is desirable to determine whether or not an automobile tire has the requisite tire pressure. The driver adjusts the gauge 10 to the requisite tire pressure, as an example, 24 pounds. The gauge 10 is placed on the valve tube 30 such that the actuating element 72 moves the depressible valve stem 74 inwardly to direct air in the tire through the ports 78, passage 34 to the upstream side of the closed valve element 38. If the tire is under-inflated, the valve element 38 does not open since the pressure of the spring 42 holds the element against the seat 36. The operator removes the gauge 10 and slightly over-inflates the tire. The gauge 10 is then repositioned on the casing 30 and the actuating element 72 opens the interior of the tire. The pressure of the air acting on the upstream side of the valve seat 36 moves the valve element 38 and spring 42 away from the valve seat 36 to permit the excess pressure to escape through the valve chamber 64 and escape port 68 to atmosphere after which time the spring 42 urges the valve element 38 against the seat 36.

If the tire is already over-inflated, all that is required is for the gauge 10 to be mounted on the casing 30 and the excess pressure vented in the manner just described. Once the air stops escaping, the operator knows that the pressure of the air in the tire is at the required setting.

The gauge 10 is particularly designed so that each driver may carry a gauge in the glove compartment of his automobile. If the car has been operated for an extended period of time, the driver can check the pressure of the tires at any time or place. This gauge is particularly adapted for long trips and provides an accurate indication of the pressure in low pressure tires or the like. It should be understood that other types of indicating means may be utilized. The various parts of the gauge 10 may be made from metals or plastic material.

Depending on the type of spring utilized, in certain cases the graduations on the outer surface of the body would not be equal. As the tension of the spring increases, the spaces between the graduations would be smaller. With such a construction it readily appears that a different type of indicator may be required.

It should also be understood that different means may be provided for maintaining the fixed relationship between spring guide 58 and the stem 52. As an example, lock nuts may be utilized rather than the threaded fastener 56.

The drawings and the foregoing specification constitute a description of the improved portable tire pressure gauge in such full, clear, concise, and exact terms as to enable any person skilled in the art to practice the invention, the scope of which is indicated by the appended claims.

What I claim as my invention is:

1. A portable pressure gauge comprising a hollow elongated body having at one end thereof a transversely extending wall provided with an opening and having at the other end thereof an open end, a tubular element having at one end thereof a head secured to the open end of said body and having at the other end thereof an inverted substantially cup-shaped socket adapted to fit freely over an end of a valve tube containing a depressible valve stem, said inverted cup-shaped socket being provided with means for depressing said valve stem and provided with means for conducting to the interior of said tubular element fluid released from said valve tube when said valve stem is depressed, a transversely extending partition within said hollow body in spaced relation to said head and dividing said hollow body into two chambers, a movable valve controlling the passage of fluid from said tubular element into one of said chambers and having a stem portion projecting through said partition into the other of said chambers, a side wall of said hollow body being provided in communication with said one chamber with an escape port for fluid from said tubular element, spring means extending through the opening in said transversely extending wall into the other of said chambers, said spring means engaging the stem portion of said movable valve and being adapted to control the opening movement of said movable valve, means upon the outer side of said transversely extending wall for regulating the effectiveness of said spring means, said last mentioned means including an inwardly extending tubular element threadedly engaging the edges of the opening in said transversely extending wall and encircling a portion of said spring means, and an elongated guide for said spring means extending through the opening in said transversely extending wall and disposed within a portion of and concentric with said tubular element, said guide having one end thereof secured to said last mentioned means and having the other end thereof spaced from and in alignment with a part of the stem portion of said movable valve and providing an abutment for limiting opening movement of said movable valve.

2. The portable pressure gauge defined in claim 1, wherein the means upon the outer side of said transversely extending wall is rotatable and cooperates with indicia on the outer surface of said elongated body to indicate the setting of said spring means, the rotation of said means varying the effectiveness of said spring means.

3. The portable pressure gauge defined in claim 1, wherein the means upon the outer side of said transversely extending wall is a disc, and said spring means bears against the lower surface of said disc.

4. The portable pressure gauge defined in claim 1, wherein the means upon the outer side of said transversely extending wall is a knurled disc substantially parallel to said transversely extending wall and is rigidly connected to an end of said inwardly extending tubular element.

5. The portable pressure gauge defined in claim 1, wherein the means upon the outer side of said transversely extending wall is a rotatable disc, and an elongated pointer is carried by said rotatable disc and cooperates with indicia on the outer surface of said elongated body to indicate the setting of said spring means.

References Cited by the Examiner

UNITED STATES PATENTS

| | | | |
|---|---|---|---|
| 960,246 | 6/10 | Ashmore | 116—34 |
| 1,216,919 | 2/17 | Ashelman et al. | 116—34 |
| 1,354,355 | 9/20 | Tryon | 116—34 |
| 1,427,146 | 8/22 | Anderson | 116—34 |

FOREIGN PATENTS 450,235  7/49  Italy.

ISADOR WEIL, *Primary Examiner.*
RICHARD C. QUEISSER, *Examiner.*